United States Patent
Arlein et al.

(10) Patent No.: US 6,594,656 B1
(45) Date of Patent: Jul. 15, 2003

(54) ACTIVE DATABASE TRIGGER PROCESSING USING A TRIGGER GATEWAY

(75) Inventors: Robert M. Arlein, Maplewood, NJ (US); Daniel Francis Lieuwen, Somerville, NJ (US); Gavin C. Michael, Sydney (AU); Joann Janet Ordille, Maplewood, NJ (US); Juliana Freire Silva, Mahwah, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/235,730

(22) Filed: Jan. 22, 1999

(51) Int. Cl.[7] .............................................. G06F 17/30
(52) U.S. Cl. ................ 707/4; 707/10; 707/1; 707/200
(58) Field of Search ................ 707/200–205, 707/1, 10, 4

(56) References Cited

U.S. PATENT DOCUMENTS

| | | | | |
|---|---|---|---|---|
| 5,530,855 A | | 6/1996 | Satoh et al. ................ | 395/600 |
| 5,535,385 A | | 7/1996 | Griffin et al. ............... | 395/600 |
| 5,564,047 A | * | 10/1996 | Bloem et al. ............... | 707/100 |
| 5,640,561 A | | 6/1997 | Satoh et al. ................ | 395/618 |
| 5,680,602 A | | 10/1997 | Bloem et al. ............... | 395/601 |
| 5,680,614 A | | 10/1997 | Bakuya et al. .............. | 395/614 |
| 5,765,160 A | | 6/1998 | Yamaguchi .................. | 707/103 |
| 6,058,393 A | * | 5/2000 | Meier et al. .................... | 707/10 |
| 6,202,070 B1 | * | 3/2001 | Nguyen et al. .............. | 707/104 |
| 6,212,514 B1 | * | 4/2001 | Eberhard et al. .............. | 707/2 |

FOREIGN PATENT DOCUMENTS

| | | | | |
|---|---|---|---|---|
| EP | 0840240 | 6/1998 | ........... | G06F/17/30 |
| EP | 0889398 | 7/1999 | ............. | G06F/9/44 |

OTHER PUBLICATIONS

Dayal et al., "Organizing Long–Running Activities with Triggers and Transactions," *SIGMOD Conference* 1990; 204–214.

Buchmann et al., "Building an Integrated Active OODBMS: Requirements, Architecture, and Design Decisions," *Proceedings of International Conference on Data Engineering* 1995; 117–128.

Widom et al., "Implementing Set–Oriented Production Ruls as an Extension to Starburst," *Proceedings of the 17th Annual Conference on Very Large Data Bases*, pp. 275–285, Barcelona, Spain (Sep. 1991).

"Chapter 1—Understanding Server Plug–Ins," from http://developer.netscape.com/docs/manuals/directory/plugin/intro.htm, pp. 1–6, downloaded and printed Jan. 12, 1999.

Lieuwen et al., "The Ode Active Database: Trigger Semantics and Implementation," *Proceedings of International conference on Data Engineering* 1996; 412–420.

Stonebraker et al., "The Design of the Postgres Rules System," *Proceedings of International Conference on Data Engineering* 1987; 365–374.

(List continued on next page.)

Primary Examiner—Hosain T. Alam
Assistant Examiner—Jean Bolte Fleurantin
(74) Attorney, Agent, or Firm—Ryan, Mason & Lewis, LLP

(57) ABSTRACT

A database system includes a trigger gateway for implementing trigger functionality. The trigger gateway is located at a communication point between a user and a database system. The trigger gateway receives database commands destined for the database and processes triggers associated with the database commands. Where appropriate, the trigger gateway forwards the database command to the database. A trigger action server, which is located remote from the trigger gateway, may execute trigger actions in response to trigger execution requests sent from the trigger gateway. Alternatively, trigger actions may be executed within the trigger gateway. Trigger processing includes the processing of triggers after failed database commands. Security features are implemented to prevent unauthorized database access through the use of triggers.

27 Claims, 4 Drawing Sheets

OTHER PUBLICATIONS

Chakravarthy et al., "Composite Events for Active Databases: Semantics, Contexts and Detection," *Proceedings of the 20th Conference on Very Large Data Bases*, Santiago, Chile, 1994; 606–617.

"Active Channel Tutorial—Introduction," from http://www.microsoft.com/indev/ie4/channels/tutorial/page0.html, pp. 1–5, downloaded and printed Jan. 12, 1999.

M. Smith, Editor: G. Good, T. Howes, R. Weltman, LDAPEXT Working Group, Internet–Draft, "Persistent Search: A Simple LDAP Change Notification Mechanism," <draft–ietf–ldaptext–trigger–01.txt>, Aug. 6, 1998, pp. 1–8.

M. Wahl, Network Working Group, "LDAPv3 Triggered Search Control," <draft–ieft–ldapext–trigger–01.txt>, Aug. 7, 1998, pp. 1–6.

Koschel et al., "Distributed Events in Active Database Systems—Letting the Genie out of the Bottle," *Journal of Data and Knowledge Engineering* (*DKE*), vol. 25, 11–28 (1998).

Koschel et al., "Configurable Event Triggered Services for CORBA–based Systems," *Proc. 2nd International Enterprise Distributed Object computing Workshop* (*EDOC'98*), San Diego, California (Nov. 1998).

H.V. Jagadish, M.A. Jones, D. Srivastava and D. Vista, "Flexible List Management in a Directory", *Proceedings of the Seventh International Conference on Information and Knowledge Management* (*CIKM*), 10–19, 1998.

* cited by examiner

ACTIVE DATABASE TRIGGER PROCESSING USING A TRIGGER GATEWAY

FIELD OF THE INVENTION

The present invention relates generally to databases. More particularly, the present invention relates to trigger processing in active databases.

BACKGROUND OF THE INVENTION

An active database is a database in which certain actions result in other actions being taken automatically by the database. An active database may be implemented using the well known database technique of triggers. A trigger defines an event, a condition, and an action. The database monitors itself for the occurrence of the event, at which time it checks the condition. If the condition is true, then the database performs the action automatically.

As an example of trigger processing, consider a database which stores employees and associated department numbers for each employee. If a database user submits a database command to delete a department number from the database, it is advantageous to have the database system automatically check to determine whether there are currently employees assigned to that department number. If there are, then the request to delete the department number should be rejected. In order to implement this functionality in a trigger, the trigger event being monitored would be the deletion of a department number, the condition would be whether there are currently any employee records which contain that department number, and the action would be to reject the database delete command.

As is well known, databases generally consist of stored data and a database management system (DBMS) which manages the stored data and which processes database commands. Currently, active database triggers are generally implemented at the DBMS level. Thus, each database system uses its own proprietary technique for implementing active database triggers. This implementation of triggers results in several problems. First, trigger implementation is not standard across different database platforms, and therefore it is difficult to port trigger facilities from one database system to another. Second, the adding of new trigger facilities requires modifications to the DBMS internal software, which can only be done by the database manufacturer. As a result, the implementation of trigger facilities locally by database administrators is not possible.

One technique used to locally implement trigger functionality is to monitor the database log file and initiate certain trigger processing when certain predetermined actions are detected in the log file. However, this technique requires knowledge of the DBMS proprietary log format which may not be available to system administrators. Another technique is the periodic polling of the state of the database to determine whether certain changes have been made. The problem with this technique is that it adds a substantial amount of overhead processing and is therefore expensive.

Another technique used to locally implement trigger functionality is the use of software plug-ins which are associated with database operations. However, such plug-ins are implemented as function calls within the database system itself, which results in several problems. First, a problem with a plug-in can result in a crash of the database system itself. Second, adding a new plug-in requires restarting the entire database system. Third, trigger portability is reduced because of the proprietary extension required to the database system.

Thus, there is a need for an improved technique for locally adding trigger processing to database systems.

SUMMARY OF THE INVENTION

In accordance with the present invention, trigger functionality is implemented at a trigger gateway which is independent of an associated database system. The trigger gateway receives database commands destined for the database system and processes triggers associated with the database commands. Where appropriate, the trigger gateway forwards the database commands to the database system for processing of those commands in a conventional manner. The use of a trigger gateway to implement trigger functionality allows the use of standard database commands and requires no modification to the database system. In fact, the database system may have no knowledge that trigger functionality is being provided by the trigger gateway.

In accordance with one aspect of the invention, trigger actions are executed by a remote trigger action server in response to a trigger execution request transmitted by the trigger gateway. The use of a trigger action server to execute trigger actions is advantageous because it allows for the updating of instructions implementing the trigger actions without interrupting the operation of the database or the trigger gateway. Alternatively, the trigger actions could be executed in the trigger gateway itself.

In accordance with security aspects of the invention, trigger actions will not be executed if such execution would result in a security breach of the security policy of the database system. Such security aspects are implemented by having the trigger gateway formulate and then perform a database query using the security authorization of a trigger author prior to executing a trigger action. If this query results in an authorization error, then the trigger action will not be executed.

In accordance with another aspect of the invention, a new type of trigger is implemented which results in the execution of a trigger action as the result of the failure of a database command. Thus, if a database command results in an error during database processing, an "after failed" trigger may be processed which will result in the execution of some trigger action specifically chosen to be executed after a failed database command.

In accordance with yet another aspect of the invention, infinite loops are prevented using novel trigger processing techniques.

These and other advantages of the invention will be apparent to those of ordinary skill in the art by reference to the following detailed description and the accompanying drawings.

DETAILED DESCRIPTION

Figure 1:
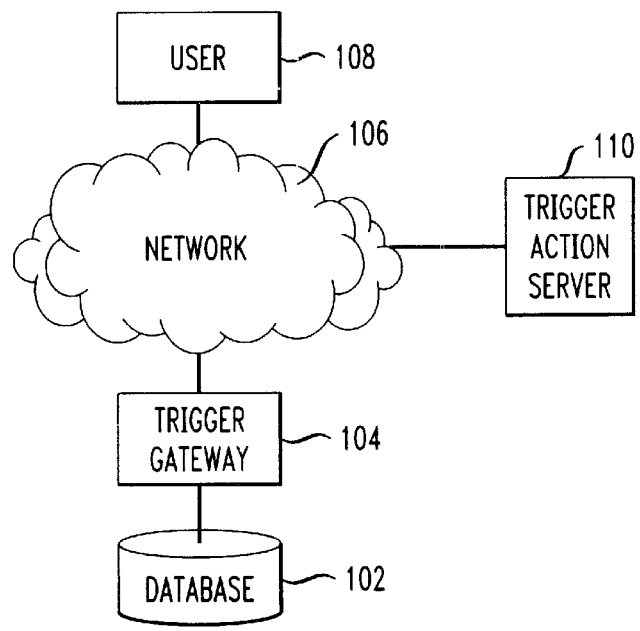
FIG. 1 illustrates a system of the type in which the present invention may be implemented.

A system of the type in which the present invention may be implemented is shown in FIG. 1. Database 102 comprises stored data and a database management system (DBMS) for managing the stored data and for processing requests for access to the stored data. In an advantageous embodiment, database 102 implements a hierarchical directory-type database system as will be described in further detail below. A user 108 is connected to the database via network 106. User 108 represents any well known computer system which communicates with the database 102 via a data communication protocol. For example, the network 106 may represent a local area network and the user 108 may communicate over the network 106 via a data packet protocol such as the Internet Protocol (IP). Various networks and network protocols could be used to allow such communication, and the particular type of network and protocol is not crucial to the present invention.

In accordance with the invention, a trigger gateway 104, which is independent of the database 102, is located at a communication point between the database 102 and the user 108, and the user sends database commands to trigger gateway 104 as if the trigger gateway 104 were database 102. The trigger gateway 104 is independent of the database 102 in that the two elements are logically independent of each other. As shown in FIG. 1, in one embodiment, the trigger gateway 104 and database 102 are software and/or hardware modules executing on different machines. In an alternate embodiment, the trigger gateway 104 and the database 102 may be different, and logically independent, software and/or hardware modules executing on the same machine. From the user perspective, the trigger gateway 104 acts as database 102. In accordance with one advantage of the present invention, the user 108 transmits standard database commands to the trigger gateway 104. The trigger gateway 104 receives the database commands, performs trigger processing, and if appropriate, forwards the database commands to the database 102 for processing. This configuration allows for the addition of trigger functionality without modification to the database 102 or to the standard database commands transmitted by the user 108.

In accordance with another aspect of the invention, a trigger action server 110 is connected to the network 106. As will be described in further detail below, the trigger action server 110 executes trigger actions in response to trigger execution requests from the trigger gateway 104.

Figure 2:
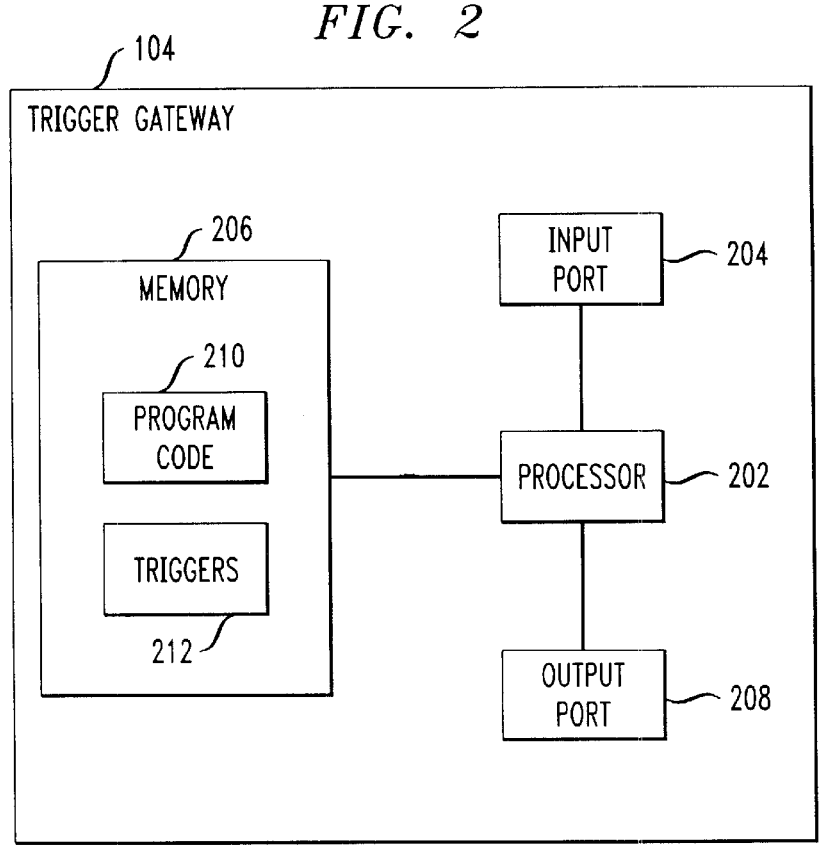
FIG. 2 is a block diagram of a computer configured to implemented a trigger gateway.

The trigger gateway 104 may be implemented by a properly configured computer, further details of which are shown in FIG. 2. FIG. 2 shows trigger gateway 104 comprising a processor 202 which controls the overall operation of the trigger gateway 104. Processor 202 is connected to input port 204, output port 208, and memory 206. Memory 206 comprises program code 210 and stored triggers 212. Memory 206 may be any type of well known computer readable medium, including without limitation, random access memory, read only memory, magnetic disk, optical disk, or a combination of such media. In operation, processor 202 controls the operation of the trigger gateway 104 by executing computer program instructions stored as program code 210. The program code 210, when executed by processor 202, implements a trigger gateway in accordance with the present invention. The program code 210 will be described in further detail below in conjunction with FIGS. 4–6. Of course, a computer implementing a trigger gateway would have other well known components as well. Such other components are not shown in FIG. 2 for clarity.

Figure 3:
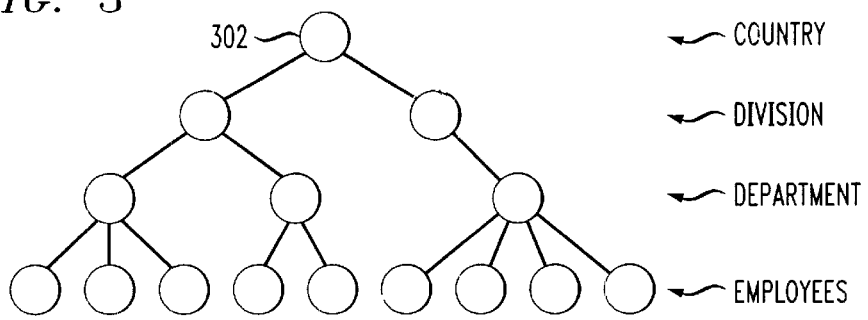
FIG. 3 is a graphical representation of data organization in a hierarchical directory-type database.

In accordance with one embodiment of the invention, the database 102 (FIG. 1) implements a hierarchical directory-type database in which data is organized in a tree structure. For example, the database 102 may implement a Lightweight Directory Access Protocol (LDAP) database which is well known in the art. LDAP directories are described in further detail in, Timothy Howes and Mark Smith, *LDAP: Programming Directory-Enabled Applications with Lightweight Directory Access Protocol*, Macmillan Technical Publishing, Indianapolis, Ind., 1997. A representation of the data organization of such a database is shown in FIG. 3. The data is organized in a tree structure with each node in the tree representing a data object. For example, assume that the database 102 implements a directory database storing information relating to the organization of a multi-national company and the employees of the company. A root node 302 represents the entry point into the database for a particular country, the second level nodes represent particular divisions, the third level nodes represent particular departments, and the fourth level nodes represent employees. Each node may contain one or more fields describing the object represented by the node. For example, the employee nodes may contain fields such as name, employee ID, telephone number, and location. For each node, one or more fields will make up the node's relative distinguished name. The values of the fields in the relative distinguished name define a unique node among the node's sibling nodes (i.e., nodes having the same parent node). For example, the employee ID field may be the relative distinguished name for the employee nodes because each employee data object may be uniquely identified by the employee ID. A distinguished name (DN) for a particular node is a concatenation of all the relative distinguished names of the nodes making up the path from the root to the particular node. Thus, a distinguished name uniquely identifies a node in the tree.

Hierarchical directory databases of the type illustrated in FIG. 3 may be queried in various ways. One type of query is to use a DN and an associated scope indicator, where the scope indicators are BASE, ONE LEVEL, or SUBTREE. This type of query may return any/all nodes within the specified scope. A BASE query may return the node specified by a particular DN. A ONE LEVEL query may return the direct children of a node specified by a particular DN. A SUBTREE query may return the entire subtree which is rooted at the node specified by a particular DN. The nodes within the specified scope which are actually returned by a query are determined by an associated query filter specifying field values.

As described above, triggers define additional actions to be taken automatically in connection with certain database actions. These triggers are stored in memory 206 as triggers 212 (FIG. 2). The stored triggers are defined as follows:

Trigger=(event, condition, action, trigger-kind, type-name, DN, scope, author).

An event defines a database action. Events are defined as BEFORE, AFTER, or AFTER FAILED, in connection with some type of access, where the access may be READ, ADD, DELETE, or MODIFY. Thus, the following events are possible: BEFORE READ, BEFORE ADD, BEFORE DELETE, BEFORE MODIFY, AFTER READ, AFTER ADD, AFTER DELETE, AFTER MODIFY, AFTER FAILED READ, AFTER FAILED ADD, AFTER FAILED DELETE, and AFTER FAILED MODIFY. It is noted that the above event list is for an embodiment which utilizes an LDAP database. Other events and access types may be provided in connection with other types of database systems.

A condition has two parts:
1) Boolean expression; and
2) list of monitored fields.

The Boolean expression is an arbitrary Boolean expression defined over the database object being accessed. The list of monitored fields defines the database fields for which the condition pertains. Thus, the condition as a whole is true if the Boolean expression is true and the database command being processed includes one or more of the fields in the list of monitored fields.

The action specifies the action to be taken if the specified event takes place and if the condition evaluates to true. In an embodiment of the invention which includes a trigger action server 110, the action may be specified by the IP-address and port of the trigger action server 110, along with additional information as will be described in further detail below in connection with the execution of trigger actions and step 604 of FIG. 6.

The trigger-kind specifies the kind of the trigger. For hierarchical directory databases, there are two kinds of triggers: type triggers and tree triggers. Type triggers are triggers which are applicable to database objects of a particular type, regardless of position in the database hierarchy. Thus, if trigger-kind="type trigger", then the type-name field in the trigger definition is used to define the type for which the trigger will be applicable. Tree triggers are triggers which are applicable to database objects that are in particular positions in the database hierarchy, regardless of the type of the object. If trigger-kind="tree trigger", then the DN and scope fields in the trigger definition are used to define which nodes in the tree this trigger is applicable to as follows. If a query (as described above) using the DN and specified scope (i.e., BASE, ONE LEVEL, SUBTREE) would return a particular node, then the trigger is applicable to that particular node. Different trigger-kinds can be defined for databases other than hierarchical directory databases. For example, in a relational database, a trigger-kind could be associated with relations (i.e., tables).

Author specifies the author of the trigger, and is used to implement security functions in accordance with one aspect of the invention. These security functions will be described in further detail below in conjunction with steps 510 and 512 of FIG. 5.

In operation, a user 108 (FIG. 1) sends a database command to database 102 via network 106. Such a database command is a standard database command for the particular type of database 102. There are no additional user commands required to implement trigger processing in accordance with the invention. The database command sent by user 108 is received by the trigger gateway 104. The steps performed by the trigger gateway 104 in accordance with the present invention will now be described in conjunction with FIGS. 4–6. As described above, the steps to be taken by the trigger gateway 104 are defined by the stored program code 210.

Figure 4:
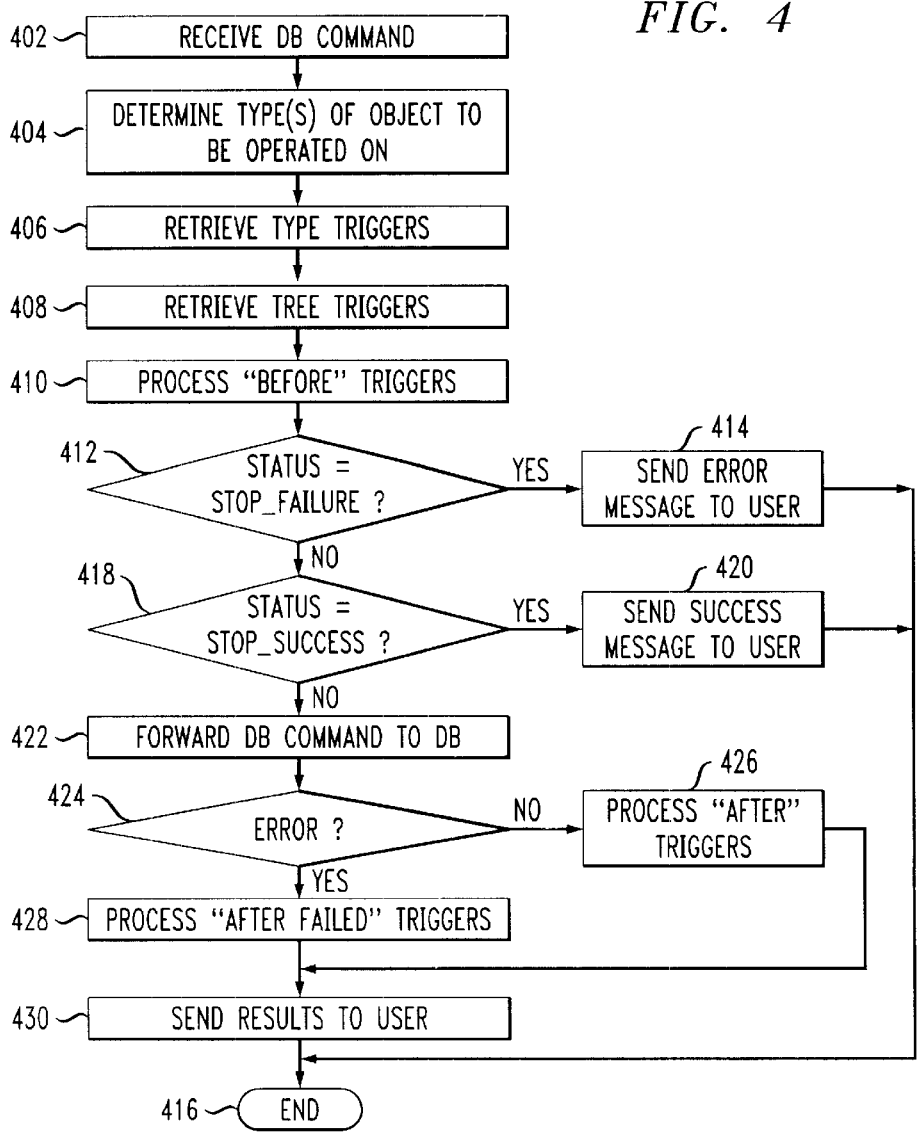
FIGS. 4–6 are flowcharts showing the steps performed by the trigger gateway in accordance with the invention.

Referring to FIG. 4, in step 402 the trigger gateway 104 receives the database command via input port 204 (FIG. 2). In step 404 the trigger gateway 104 determines the type(s) of the object to be operated on in accordance with the command sent by the user. As is well known, each database command will request some operation to be performed on an object(s) in the database. Each object has one or more associated types. For example, if the database request was an add request, then the trigger gateway 104 will determine the type(s) of the object to be added by evaluating the definition of the object in the add command. Alternatively, if the database command was other than an add command (e.g.

read, delete, modify), then the database object to be operated on already exists in the database and the trigger gateway 104 will determine the type(s) of the object. For example, if the database is an LDAP database, the trigger gateway 104 will send to the database a request for the objectclass field of the object to determine the type(s) of the object. Alternatively, if the database is a relational database utilizing SQL for queries, the type(s) of the object may be determined by looking at the FROM clause of the SQL database command.

In step 406, the trigger gateway 104 retrieves the type triggers associated with the database command using the type(s) determined in step 404. As described above, the format of the triggers 212 stored in memory 206 include an event field (including an access type) and a trigger-kind field. In step 406, the trigger gateway 104 searches the triggers 212 for triggers defined with an access type matching the access type in the received database command, a trigger-kind="type", and a type-name which matches the type(s) of the object determined in step 404. For example, assume that the database command received from the user 108 was for an ADD operation for an object of type="first-type". Step 406 will retrieve triggers 212 which have trigger-kind ="type", type-name="first-type", and access portion of the event field="ADD".

In step 408 the trigger gateway 104 retrieves the tree triggers associated with the database command. As described above, tree triggers are applicable to objects in particular locations in the database hierarchy. More particularly, a tree trigger is applicable to a particular object if the access type in the event field of the trigger definition matches the access type in the received database command, and a query using the DN and scope specified in the trigger would return the object to be operated on. Stated another way, a tree trigger is applicable to an object to be operated on if:

1) trigger access type=access type of database command; AND
2) the DN specified in the trigger specifies the object itself or an object that is an ancestor of the object itself AND
   a) the scope specified in the trigger=SUBTREE; or
   b) the scope specified in the trigger=ONE LEVEL and the DN specified in the trigger specifies the parent of the object to be operated on; or
   c) the scope specified in the trigger=BASE and the DN specified in the trigger specifies the object to be operated on.

After the processing of steps 406 and 408, the trigger gateway 104 has a list of all type triggers and tree triggers associated with the database command. However, it has not yet been determined whether the actions associated with these triggers will be executed because other tests must first be performed as described in further detail below. It is noted that steps 406 and 408 describe one technique for identifying triggers which are associated with a database command in an embodiment of the invention in which the database 102 implements a hierarchical directory-type database. However, one skilled in the art would recognize that there are various alternate techniques for identifying triggers which are associated with a particular database command in connection with a hierarchical directory-type database. Further, in alternate embodiments in which the present invention is implemented in a system using a different type of database, other techniques could be readily implemented to identify triggers associated with a particular database command.

In step 410 the trigger gateway 104 processes the potentially relevant "before" triggers by calling the process-trigger subroutine. As described above, the trigger definition includes an event field, which events are defined as BEFORE, AFTER, or AFTER FAILED, in connection with some type of access. At step 410 the trigger gateway 104 looks at the identified triggers and processes those triggers that indicate that they are processed "before" some access. The actual processing of triggers in accordance with the process-trigger subroutine will be described below in connection with FIG. 5.

In step 412 the trigger gateway 104 determines whether the status of the trigger processing step 410 was Stop_Failure. There are three possible status results from the processing of a trigger. Stop_Failure indicates that the trigger failed and that the database command should not be further processed (i.e., the database command should not be forwarded to the database 102 for processing). Stop_Success indicates that the trigger processed successfully but that the database command should not be further processed. Proceed indicates that the trigger processed successfully and that the database command should be further processed (i.e., the database command should be forwarded to the database 102 for processing). If the test in step 412 indicates that the status of the trigger processing step 410 was Stop_Failure, then in step 414 an error message is sent to the user 108 and processing terminates in step 416. If the test in step 412 indicates that the status of the trigger processing step 410 was not Stop_Failure, then in step 418 the trigger gateway 104 determines whether the status of the trigger processing step 410 was Stop_Success. If the test in step 418 indicates that the status of the trigger processing step 410 was Stop_Success then in step 420 an appropriate success message is sent to the user 108 and processing terminates in step 416. If the test in step 418 indicates that the status of the trigger processing step 410 was not Stop_Success, then it is known that the status was Proceed and in step 422 the database command sent by user 108 and received by trigger gateway 104 is forwarded to the database 102 for processing via output port 208 (FIG. 2). It is noted that at this point, the database 102 receives a standard database command and the database 102 has no knowledge that trigger processing has taken place. Upon processing of the database command, the database 102 will return the results to the trigger gateway 104.

In accordance with one aspect of the invention, certain triggers are processed following a database error. These triggers are the "after failed" triggers described above. Thus, in step 424 it is determined whether there was an error in the processing of the database command by the database 102. This is determined by evaluating the results returned from the database 102. If no error occurred, then in step 426 the "after" triggers are processed by calling the process-trigger subroutine. If the database indicated that an error occurred, then in step 428 the "after failed" triggers are processed by calling the process-trigger subroutine. Following step 426 or 428, the results are sent to the user in step 430 and processing terminates in step 416.

The process-trigger subroutine is described in connection with the flowchart of FIG. 5. The process-trigger subroutine is initiated from step 410 for before triggers, step 426 for after triggers, and step 428 for failed triggers. When the subroutine is entered, it is assumed to be entered with a list of triggers to be processed. Thus, when the process trigger subroutine is entered as a result of step 410, a list of the identified before triggers is passed to the process-trigger subroutine for processing. Similarly, when the process-trigger subroutine is entered as a result of step 426, a list of the identified after triggers is passed to the process-trigger subroutine for processing. When the process-trigger subroutine is entered as a result of step 428, a list of the identified failed triggers is passed to the process-trigger subroutine for processing.

In step 502 a status variable is set to Proceed. As described above, this status variable can have one of three possible values: Stop_Failure, Stop_Success, and Proceed. These three values have a predetermined ordering as follows: Stop_Failure<Stop_Success<Proceed. The use of this status variable will be described in further detail below.

In step 504 the first trigger passed to the process-trigger routine is selected for processing. In step 506 the intersection of the list of monitored fields in the condition parameter of the trigger and the fields included in the database command is calculated and assigned to the set relevant_access. If this intersection is the null set (i.e., none of the fields included in the database command match any of the fields in the list of monitored fields in the condition parameter), then the action associated with the current trigger will not be executed and the test in step 508 will be Yes and control will pass to step 516 to determine if there are any more triggers to process. If the intersection is not the null set (i.e., at least one of the fields included in the database command matches a field in the list of monitored fields in the condition parameter), then the test in step 508 will be No, and control will pass to step 510.

Step 510 implements a security aspect of the present invention. The need for a security policy arises because trigger processing may, in some situations, violate the security policy of the database 102. It is undesirable to provide access to information via a trigger that a user could not have accessed via a standard database command. For example, a trigger author might not be authorized to know any information about employee salaries. If the trigger author could set a trigger to monitor a database salary field, then he/she could determine that the salary for an employee has been changed. This would provide the trigger author with sensitive information thus violating the security policy. Steps 510 and 512 prevent such a security breach as follows. In step 510, the trigger gateway 104 submits a query command to the database 102 using the security authorization of the author of the trigger, where the query command is a request for access (e.g. read) to the fields in the set relevant_access. If the query returns with an authorization error, then it indicates that execution of the trigger action may violate the security policy of the DB. In such a case, the test in step 512 is Yes and control passes to step 516 without further processing of the trigger. If the query does not return with an authorization error, then the execution of the trigger action would not violate the security policy of the DB. In such a case, the test in step 512 is No and control passes to step 514.

In step 514, the provisionally-fire-trigger subroutine is called in which the current trigger is tested to determine if its action should be executed, and for executing the trigger action if appropriate. The provisionally-fire-trigger subroutine will be described below in connection with FIG. 6. After the provisionally-fire-trigger subroutine is called, it is determined in step 516 whether there are additional triggers to be processed. If there are not, then the process-trigger routine ends in step 518. If there are additional triggers to be processed, then the next trigger is selected in step 520 and control returns to step 506 for processing of the next trigger.

Figure 6:
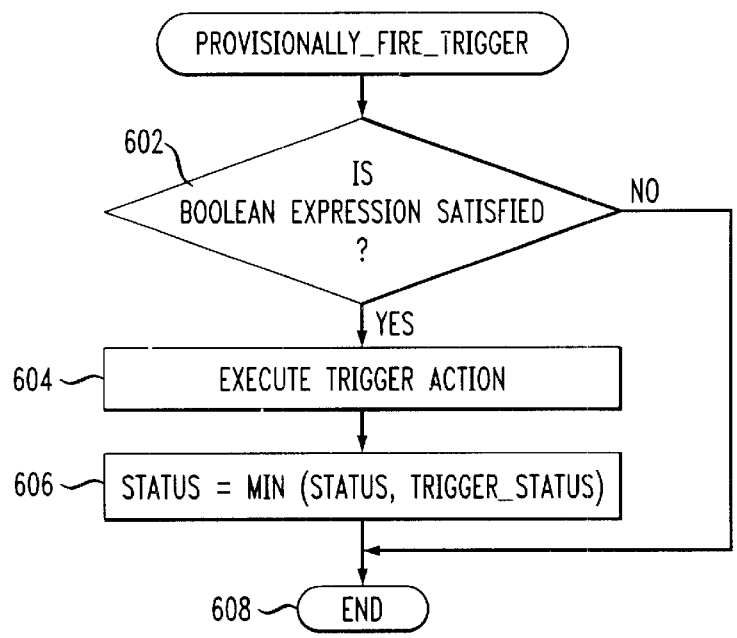

The provisionally-fire-trigger subroutine is shown in FIG. 6. In step 602, the Boolean expression part of the condition parameter of the trigger definition is tested. If the condition is satisfied, then the trigger action specified in the trigger definition is executed in step 604. If the condition is not satisfied, the subroutine ends in step 608 without executing the trigger action. In accordance with one aspect of the invention, the trigger is executed by sending a trigger execution request to the trigger action server 110 via the network 106. Upon receipt of the trigger execution request, the trigger action server 110 will execute the trigger. One benefit of executing trigger actions in the trigger action server is that the instructions for implementing the trigger actions may be updated in the trigger action server 110 without interrupting the operation of the database 102 or the trigger gateway 104. The trigger gateway 104 may pass parameters to the trigger action server 110 which convey information which will allow the trigger action server 110 to correctly execute the appropriate action. For example, the trigger gateway 104 may send some subset of the values (before and/or after modification) of the database object accessed by the database command, the DN of the object, an identification of the trigger being processed, and other more detailed information about the trigger. The trigger action server 110 uses the information passed from the trigger gateway 104 to identify a routine to execute. The trigger action server 110 executes the identified routine using the information received from the trigger gateway 104. As one example, the trigger action server 110 may identify an appropriate routine to execute by reference to an array which is indexed by event type.

Alternatively, the trigger action could be executed in the trigger gateway 104 itself. This could be done by having the trigger specify a library to dynamically link-in and a name of a function to call for the action. The function would then accept parameters as described above in connection with execution by the trigger action server 110.

After the trigger is executed, a trigger_status will be returned from the trigger action server 110 where the value of trigger_status will be one of the three possible status values: Proceed, Stop_Success, or Stop_Failure, as described above. In step 606, the variable status will be assigned the minimum of the current value of the variable status and the trigger_status, where "minimum" is defined in accordance with the ordering of the status values as described above. The provisionally-fire-trigger routine ends at step 608.

Figure 5:
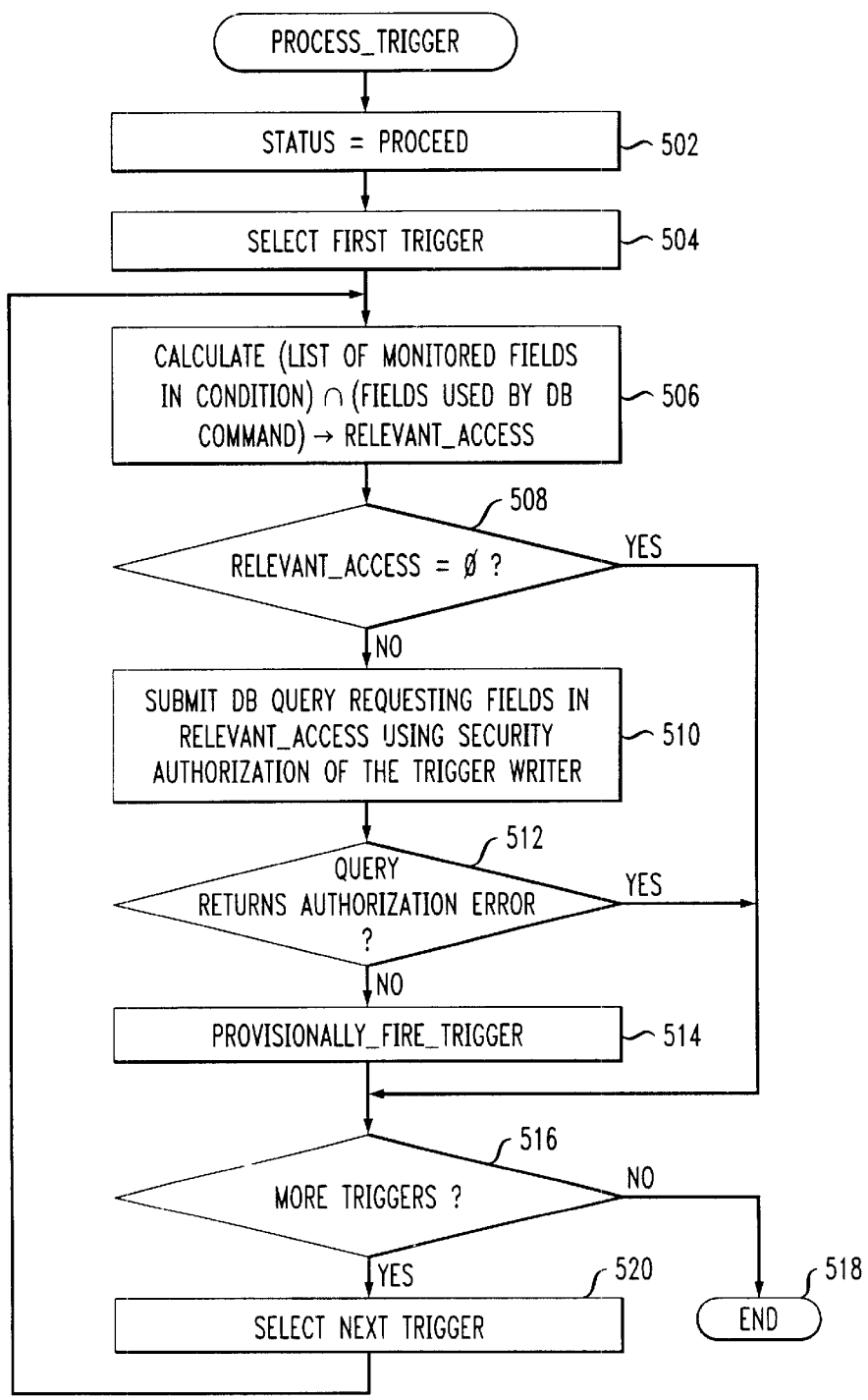

Although the flowcharts of FIGS. 5 and 6 suggest a sequential processing of triggers, the triggers may also be processed in parallel to improve the performance of trigger processing. In such a case, step 606 would be preceded by semaphore acquisition and followed by semaphore release in order to maintain the proper value for the status variable. Also, rather than returning immediately at step 518, the trigger gateway 104 would wait until all the triggers were processed to completion and then return. The trigger gateway 104 would select a trigger and start a thread to execute steps 506, 508, 510, 512, and 514 for that trigger. After starting that thread, the system could pick the next trigger and start a thread for it, and so on.

Figure 7:
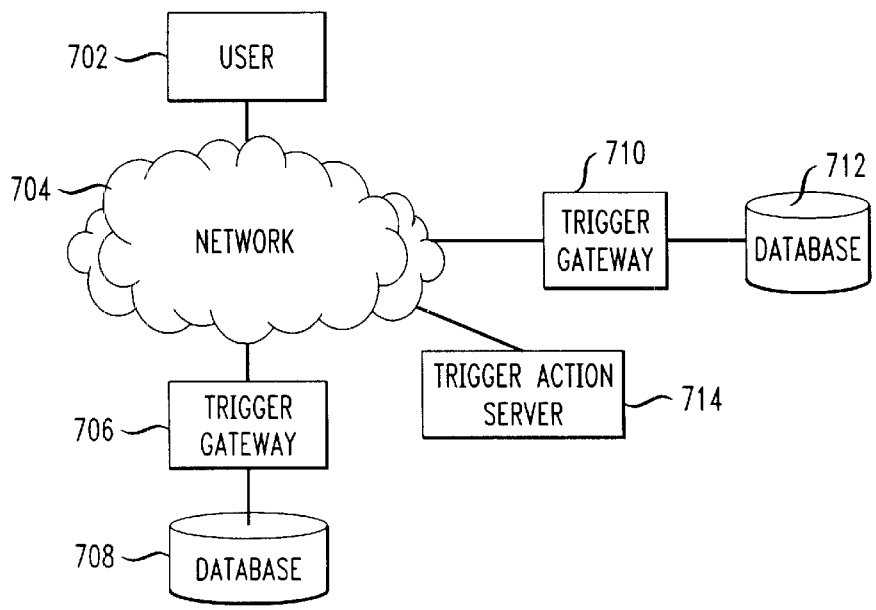
FIG. 7 illustrates a system of the type in which the present invention may be implemented to prevent infinite loops during trigger processing.

It is noted that in certain situations, trigger processing could result in a database system entering an infinite loop. For example, consider the database system shown in FIG. 7. Database 708 and database 712 are related in that they contain consistent data such that an update to one of the databases requires the same update to the other database. Database 708 has an associated trigger gateway 706 and database 712 has associated trigger gateway 710. Each of the trigger gateways is configured with appropriate triggers to implement the consistency features of the database system. An infinite loop may occur as follows. Consider a user 702 sending a database command to modify a database object in database 708. The database command is received by trigger gateway 706 where it is determined that a trigger action should be executed which results in sending an identical database command to database 712 in order to update database 712 and maintain consistency. The trigger gateway 706 then sends an appropriate trigger execution request to trigger action server 714 which results in execution of a trigger which will send an appropriate database command to trigger gateway 710. Upon receipt of the command, trigger gateway 710 also determines that a trigger action should be executed which results in an appropriate trigger execution request being sent to trigger action server 714 which results in execution of a trigger which will send an appropriate database command to update database 708 and maintain consistency. It can be seen that such processing would result in an infinite loop because upon receipt of a database update command, each trigger gateway initiates execution of a trigger action to update the database associated with the other trigger gateway.

One solution to this problem is to tag each database command with an identification of the source of the command. Database commands originating from trigger action server 714 are labeled as originating from the trigger gateway which caused the trigger action server to send the database command. Upon receipt of a trigger execution request, the trigger action server 714 will not execute the associated action if doing so would result in sending a database update command to the gateway from which the trigger execution request is labeled as originating from. This technique would solve the infinite loop problem described above. Another solution to the problem is to suspend trigger processing for certain database commands received from certain users. One way to accomplish this suspension is to supply users with a mechanism that will allow them to directly access databases 708 and 712 without going through trigger gateways 706 and 710 respectively. Since the gateways never see the database commands, no trigger processing is invoked in response to the commands. Note, however, that these techniques have some risk because if the trigger processing results in the maintaining of database consistency between two databases, then the user needs to take affirmative steps to ensure that consistency is maintained. In the first case, triggers must be carefully constructed to avoid inconsistency. They must be simple, for instance setting the fields in the other database to values existing in the trigger originating database. Careful construction works in the second case as well. However, extensions are possible as well in the second case—for instance, allowing fixed-depth fixed-point computations of field values.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, although the invention is described in conjunction with a hierarchical directory-type database, the principles of the present invention may be implemented in other types of databases as well.

We claim:

1. A method for operation of a trigger gateway which is independent of a database management system, for processing database triggers, each of said triggers having an associated action, said method comprising the steps of:

receiving a database command destined for said database management system;

identifying at least one trigger associated with said database command; and processing said at least one trigger.

2. The method of claim 1 wherein said database management system is a hierarchical database management system and wherein said step of identifying at least one trigger further comprises the steps of:

identifying type triggers associated with said database command; and identifying tree triggers associated with said database command.

3. The method of claim 1 wherein said step of processing said at least one trigger further comprises the step of:

determining whether the action associated with said at least one trigger is to be executed.

4. The method of claim 3 further comprising the step of:

initiating execution of the action associated with said at least one trigger if it is determined that the action associated with said at least one trigger is to be executed.

5. The method of claim 4 wherein said step of initiating execution further comprises the step of:

transmitting a trigger execution request to a trigger action server to initiate execution of the action associated with said at least one trigger at said trigger action server.

6. The method of claim 4 wherein said step of initiating execution further comprises the step of:

executing the action associated with said at least one trigger at said gateway.

7. The method of claim 4 further comprising the step of:

transmitting said database command to said database management system for processing only if said execution of the action associated with said at least one trigger returns a status indicating that said database command is to be transmitted to said database management system.

8. The method of claim 1 further comprising the step of:

transmitting said database command to said database management system for processing.

9. The method of claim 3 wherein said step of determining whether the action associated with said at least one trigger is to be executed further comprises the step of:

determining that the action associated with said at least one trigger is not to be executed if said execution would violate a security authorization of the author of said at least one trigger.

10. The method of claim 9 wherein said step of determining that the action associated with said at least one trigger is not to be executed if said execution would violate a security authorization of the author of said at least one trigger further comprises the steps of:

transmitting to said database management system a database query command using said security authorization; and determining that the execution of the action associated with said at least one trigger would violate said security authorization if the database management system returns an error in response to said database query command.

11. The method of claim 3 wherein said step of determining whether the action associated with said at least one trigger is to be executed further comprises the step of:

determining that the action associated with said at least one trigger is not to be executed if said action would result an update to a second database management system from which said database command originated.

12. A database trigger gateway which is independent of a database management system, for processing database triggers comprising:

a memory storing a plurality of triggers, each of said triggers having an associated action;

an input port for receiving a database command destined for said database management system;

means for identifying at least one trigger associated with said database command; and means for processing said at least one trigger.

13. The database trigger gateway of claim 12 wherein said database management system is a hierarchical database management system and wherein said means for identifying at least one trigger further comprises:

means for identifying type triggers associated with said database command; and means for identifying tree triggers associated with said database command.

14. The database trigger gateway of claim 12 wherein said means for processing said at least one trigger further comprises:

means for determining whether the action associated with said at least one trigger is to be executed.

15. The database trigger gateway of claim 14 further comprising:

means for initiating execution of the action associated with said at least one trigger if it is determined that the action associated with said at least one trigger is to be executed.

16. The database trigger gateway of claim 15 where in said means for initiating execution further comprises:

means for transmitting a trigger execution request to a trigger action server to initiate execution of the action associated with said at least one trigger at said trigger action server.

17. The database trigger gateway of claim 15 wherein said means for initiating execution further comprises:

means for executing the action associated with said at least one trigger at said gateway.

18. The database trigger gateway of claim 12 further comprising:

means for transmitting said database command to said database management system for processing.

19. The database trigger gateway of claim 14 wherein said means for determining whether the action associated with said at least one trigger is to be executed further comprises:

means for determining that the action associated with said at least one trigger is not to be executed if said execution would violate a security authorization of the author of said at least one trigger.

20. The database trigger gateway of claim 19 wherein said means for determining that the action associated with said at least one trigger is not to be executed if said execution would violate a security authorization of the author of said at least one trigger further comprises:

means for transmitting to said database management system a database query command using said security authorization; and means for determining that the execution of the action associated with said at least one trigger would violate said security authorization if the database management system returns an error in response to said database query command.

21. The database trigger gateway of claim 14 wherein said means for determining whether the action associated with said at least one trigger is to be executed further comprises:
means for determining that the action associated with said at least one trigger is not to be executed if said action would result in an update to a second database management system from which said database command originated.

22. A system comprising:
a database comprising:
stored data; and
a management system for accessing said stored data;
a trigger gateway independent of said database, said trigger gateway comprising:
a memory storing a plurality of triggers, each of said triggers having an associated action;
means for receiving database commands destined for said database;
means for identifying at least one trigger associated with said database command; and
means for processing said at least one trigger.

23. The system of claim 22 further comprising:
a trigger action server; and
wherein said trigger gateway further comprises:
means for transmitting a trigger execution request to said trigger action server for initiating execution of a trigger action at said trigger action server.

24. The system of claim 22 wherein said trigger gateway further comprises: means for transmitting said database command to said database.

25. The system of claim 22 wherein said database and said trigger gateway are co-located.

26. The system of claim 22 wherein said trigger gateway is located remote from said database.

27. A method for processing database triggers utilizing a trigger gateway comprising the steps of:
receiving a database command destined for a database management system;
identifying at least one trigger associated with a failure of said database command;
forwarding said database command to said database management system; and
processing said at least one trigger at said trigger gateway upon the failure of said database command.

* * * * *